United States Patent [19]

Takeuchi et al.

[11] Patent Number: 4,833,593
[45] Date of Patent: * May 23, 1989

[54] METHOD FOR PREPARING INFORMATION TABLES FOR A DIGITAL VALVE CONTROL APPARATUS

[75] Inventors: Kunihiko Takeuchi, Kawasaki; Kiyoshi Hayashi; Yasuo Shimomura, both of Tokyo, all of Japan

[73] Assignee: Tokyo Keiki Company, Ltd., Tokyo, Japan

[*] Notice: The portion of the term of this patent subsequent to Jul. 9, 2002 has been disclaimed.

[21] Appl. No.: 576,923

[22] Filed: Feb. 3, 1984

[30] Foreign Application Priority Data

Feb. 7, 1983 [JP] Japan .................................. 58-18652

[51] Int. Cl.$^4$ ............................................. G05B 11/32
[52] U.S. Cl. ..................................... 364/191; 364/174; 318/696; 251/129.01; 137/624.12; 137/624.2
[58] Field of Search ................. 364/191, 174; 318/696; 251/129, 131, 132; 137/624.11, 624.12, 624.18, 624.2

[56] References Cited

U.S. PATENT DOCUMENTS 4,156,170  5/1979  Strunc ................................. 318/696
4,528,491  7/1985  Takeuchi et al. .................... 318/568

Primary Examiner—Jerry Smith
Assistant Examiner—John R. Lastova
Attorney, Agent, or Firm—Wenderoth, Lind & Ponack

[57] ABSTRACT

An external system for preparing information tables is connected by a connector to a digital valve control system which controls a digital valve by driving a pulse motor according to the information tables. The digital valve control system stores in the memory a first information table for determining the control amount for the digital valve and a second information table for determining the interval between the generation of motor driving pulses. The first information table for determining the control amount is fixedly stored in the memory and the second information table for determining the type of control pattern is stored in the memory which is capable of writing and reading the information which can be freely prepared, corrected and modified by the external system. The second information table is prepared by the keyboard of the external system, transferred to the digital valve control system and written in the memory. The digital valve is actually controlled by using the prepared information table to check the load condition and the correction of the second information table is repeated by the external system until the optimum result is obtained, and the external system is then disconnected when a desired control characteristic is obtained.

4 Claims, 7 Drawing Sheets

METHOD FOR PREPARING INFORMATION TABLES FOR A DIGITAL VALVE CONTROL APPARATUS

BACKGROUND OF THE INVENTION

The present invention relates to a method for preparing information tables for setting control characteristics of a digital valve control apparatus which controls a flow rate and a pressure of a hydraulic equipment by the driving of a pulse motor.

For the purpose of controlling a digital valve for which the opening is adjusted by the step rotation of the pulse motor, the present invention proposes an apparatus in which the number of pulses of the pulse motor corresponding to the preset opening is divided into N parts, the number of divided pulses in each divided part is stored as an information table the interval between pulse motor drive pulses correpsonding to the divided pulses of N divided parts is stored as another information table, the corresponding information table is read out by specifying the block of each information table and the motor drive pulses in the number corresponding to the number of divided pulses are generated in sequence at the pulse interval for divided parts so that a desired control pattern is obtained.

The information table which determines the control characteristics of such digital valve control apparatus is generally prepared by writing the table data prepared in advance into a special memory such as the ROM for reading out the data and incorporated in the apparatus. However, in case of the control apparatus provided with the digital valve, there is a problem that the information table cannot be fixedly determined since whether or not the control characteristics can be obtained is not understood unless the apparatus is actually operated according to the preset information table.

BRIEF SUMMARY OF THE INVENTION

An object of the present invention is to provide a method for preparing an information table for a digital valve control apparatus which is adapted to permit simple and easy preparation of the information table for obtaining the control characteristics of an optimum digital valve in accordance with a subject to be controlled.

Another object of the present invention is to provide a method for preparing an information table for a digital valve control apparatus which is adapted to permit easy correction and alteration of the prepared information table.

Another further object of the present invention is to provide a method for preparing an information table for a digital valve control apparatus which is adapted to prepare the information table providing optimum control characteristics through correction of the information table based on the test operation of the digital valve according to the prepared information table and the results of operation test.

The aforementioned objects and other objects, features and advantages of the invention will become apparent from the following description taken in connection with the accompany drawings.

DETAILED DESCRIPTION OF THE PREFERRED EMBODIMENT

Figure 1:
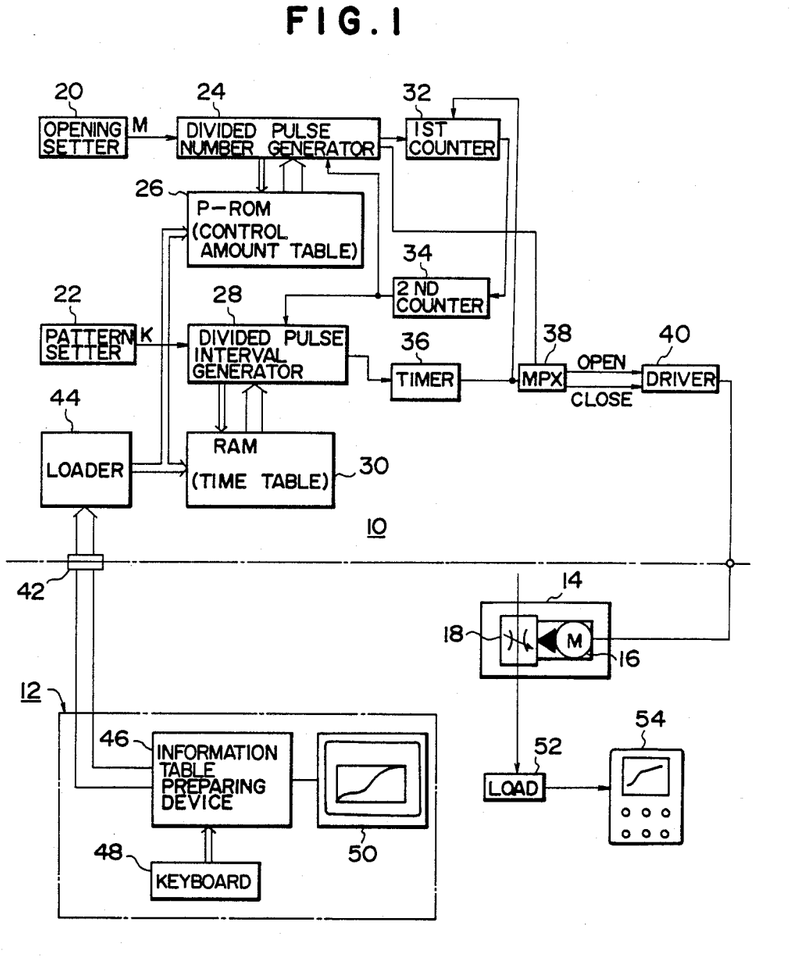
FIG. 1 is a block diagram showing the configuration of the apparatus for use in the method for preparing the information table in accordance with the present invention.

FIG. 1 is a block diagram showing the configuration of the digital valve control apparatus and the support device for use in a method for preparing the information table in accordance with the present invention.

The system comprises the digital valve control apparatus 10, the support apparatus 12 and the digital valve 14 which is controlled by said digital valve control apparatus 10 and provided with the variable throttle 18 whose opening is adjusted by the step rotation of the pulse motor 16, wherein the flow rate of the load 52 is controlled by the adjustment of the variable throttle 18.

The digital valve control apparatus 10 comprises the opening setter 20 for setting the opening of the digital valve 14 and the pattern setter 22 for specifying the type of pattern for actuating the digital valve to the opening set by the opening setter 20. The output of the opening setter 20 is supplied to the divided pulse number generator 24 which is connected to a special memory 26 for reacing which employs a P-ROM for fixedly storing the control amount information table. The control amount information table stored in the special memory 26 stores the number M of pulses for movement of the pulse motor 16 corresponding to the set opening of the digital valve 14, e.g. the numbers $n_0 \sim n_7$ of divided pulses of N=8 divided parts as one block and also stores the blocks corresponding to the number of pulses for maximum control amount as the information table.

On the other hand, the output of the pattern setter 22 is supplied to the divided pulse interval generator 28 which is connected to a memory 30 such as a RAM which is capable of writing and reading in which the time information table is written. As the time information table, the memory 30 stores pulse intervals $T^0 \sim T^7$ of motor drive pulses corresponding to the N=8 divided parts in the blocks of the control amount information table of the memory 26 as the second information table.

The output of the divided pulse number generator 24 is supplied to the first counter 32 employing a up/down counter in which the number n of pulses read out from the control amount table of the memory 26 by the divided pulse number generator 24 is preset and the pulses from the timer 36 described later are counted. When the first counter reaches the preset value n, the ssecond counter 34 in the next stage produces the counting output. The second counter 34 has the function to output and reset the divided pulse number generator 24 and the divided pulse interval generator 28 when the second counter counts the dividing number = 8 of the information table memories 26 and 30.

Moreover the output of the divided pulse interval generator 28 is supplied to timer 36 which outputs the driving pulse for the pulse motor 16 which has a certain specified pulse width at the pulse interval based on pulse interval Tn outputted from the divided pulse interval generator 28. The output of the timer 36 is supplied to the multiplexer 38 to which the signal which determines the direction of rotation of the pulse motor or the opening/closing direction of the digital valve 14 is supplied from the divided pulse number generator 24. The CW pulse (open) for the motor 16 of the digital valve 14 which causes rotation and the CCW pulse (close) for the motor 16 which causes counterclockwise rotation are outputted according to said signal for determining the opening/closing direction of the digital valve 14. The driver 40 drives the pulse motor 16 of the digital valve 14 according to the pulse from multiplexer 38.

On the other hand, the loader 44 connected to the memory 30 is provided in the digital valve control apparatus 10 to perform data transfer between the support apparatus 12 and the memory 30 of the digital valve control apparatus 10 and reading or writing of the table data through the transfer of information table data between the memory 30 and the support apparatus 12.

The following describes support apparatus 12 provided as an external unit. The support apparatus 12 comprises the table information preparing device 46 which employs a micro-computer, etc., keyboard 48 for inputting the information table by the operator and a CRT display 50 which displays the control pattern of the digital valve 14 made by the information table preparing device 46 and is connected to the digital valve control apparatus 10 by the connectors 42.

The monitor 54 such as an oscilloscope or visiscope, is provided to monitor the operation of the load 52 in order to determine the adaptability of the result of control of digital valve 14 based on the information table prepared in accordance with the support apparatus 12.

The following describes the information table for controlling the digital valve 14 which is prepared in the support apparatus 12 shown in FIG. 1.

Figure 2:
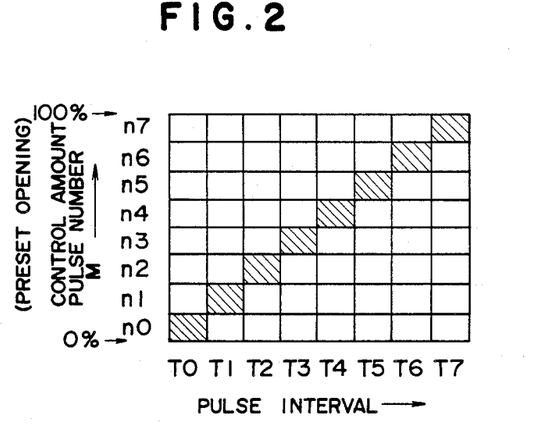
FIG. 2 is an illustration showing the principle of preparing the information table in accordance with the present invention.

FIG. 2 is a graph showing the principle of preparing the information table to be used in the present invention. The control pulse number M corresponding to the set opening of the digital valve is assigned to the vertical axis and the pulse interval $T_0 \sim T^7$ corresponmding to the divided pulse number $n_0 \sim n_7$ is assigned to the horizontal axis. Preparation of the information table in accordance with the present invention as to the coordinate system shown in FIG. 2 is such that the divided pulse number M of the vertical shaft is divided by $N = 8$ to determine the divided pulse number $n_0 \sim n_7$ and simultaneously the pulse interval $T_0 \sim T_7$ corresponding to the divided pulse number $n_0 \sim n_7$ the control characteristics of the digital valve in the intersecting parts shown as being hatched in the table, e.g. the variation of the opening of the digital valve in reference to the time axis is determined for each divided part, the divided pulse number $n_0 \sim n^7$ is fixedly written as the control amount information table in the memory and the divided pulse interval $T_0 \sim T^7$ is stored as the time information table in the memory.

Specifically, if the number of movement pulses of the pulse motor is 8 and the set opening of the digital valve corresponding to this number of pulses is $M = 8$, each divided pulse number shown in FIG. 2 is given as $n_0 \sim n_7 = (M/N) = (16/16) = 1$ and the number of pulses of the pulse motor which is $n_0 \sim n_7 = 1$ is stored in the control amount table.

On the other hand, for the control amount information table which becomes $n_0 \sim n_7 = 1$, the time table which specifies the pulse interval $T_0' \sim T^7$ shown in Table 1 below is prepared.

TABLE 1

|       | TS - 1 | TS - 2 | TS - 3 |
|-------|--------|--------|--------|
| $T_0$ | 1      | 3      | 5      |
| $T_1$ | 1      | 3      | 5      |
| $T_2$ | 1      | 3      | 5      |
| $T_3$ | 1      | 3      | 5      |
| $T_4$ | 2      | 2      | 4      |
| $T_5$ | 2      | 2      | 4      |
| $T_6$ | 2      | 2      | 4      |
| $T_7$ | 2      | 2      | 3      |

Though the pulse interval $T_0 \sim T^7$ of the time information table shown in Table 1 is given as $1 \sim 5$ for convenience in the explanation, the pulse interval which determines the speed of the pulse motor is actually stored as the minimum value which is, for example, $10\mu$ sec.

Figure 3:
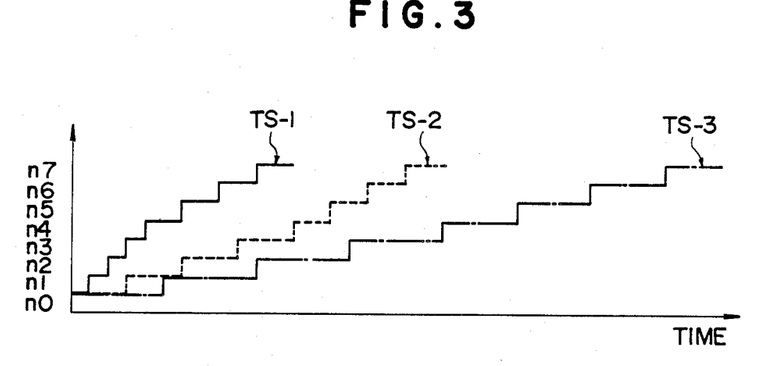
FIG. 3 is a control characteristic diagram of the digital valve obtained from the information table in accordance with the present invention.

FIG. 3 is the graph showing the control characteristic of the digital valve obtained when the divided pulse number of the control amount table is $n_0 \sim n_7 = 1$ and the time table is Table 1 shown in the foregoing.

In other words, the control characteristic shown in FIG. 3 is materialized by reading in order the data of the control amount table and the time table in the sequence of storage addresses and generating the driving pulse for the pulse motor. For example, referring to TS-1 in said Table 1 as an example, the control characteristic of TS-1 shown in FIG. 3 is obtained by rotating the pulse motor one step with the reading of the first $n_0$ and $T_0$, further rotating the pusle motor one step according to $n_1 = 1$ with the reading of next $n_1$ and $T_1$ after the pulse interval corresponding to $T^0$ and subsequently rotating the pulse motor every one step at the pulse interval specified in the TS table according to $n_2 \sim n_7$ and $T_2 \sim T_7$.

In case of the control characteristic of the digital valve based on such control amount table and the time table, the set opening given by the control amount table depends on the pulse number for the maximum control amount of the pulse motor which drives the digital valve and therefore the digital valve can meet all set openings by N - dividing the set opening M up to the pulse number of the maximum control amount if the number of blocks corresponding to the maximum number of movement pulses, for example, the divided pulse number $n_0 \sim n_7$ for 255 blocks is prepared as the control amount information taxes. On the other hand, the setting of the pulse interval as the time table information determines the control pattern for the digital valve as known from FIG. 3 and the time information table can be almost infinitely prepared. Several kinds of time information table which is selectable in accordance with the characteristic of the control load of the digital valve is to be prepared and stored in the memory capable of writing and reading the information to permit optional correction and alteration of the control pattern as required without sotring the information fixedly.

In the graph shown in FIG. 3, the number of movement pulses for the pulse motor which determines the control amount table is given as $M=8$ but in case of the actual digital valve, the number of pulses which determines the maximum control amount is a larger number, for example, 256 pulses. Accordingly, for preparation of the control amount information table, if the control pulse number corresponding to the set opening is given for example, as $M=32$, $n_0 \sim n_7 = (M/8) = (32/8) = 4$ is obtained and $n_0 \sim n_7 = 4$ is stored in eight storage addresses.

If the set opening M is, for example, 50, $(M/8) = (50/8) = 6$ plus remainder 2 is obtained and remainder 2 is produced from the calculation with the same divided pulse number $n=6$. Thus, the control pulse number $M=50$ which gives the set opening cannot be reached. Therefore, if a remainder is produced for the divided pulse number $N=8$ in preparation of the control amount information table, $50=6\times6+7\times2$ is, for example, given for $M=50$ and $n=6$ is stored in six addresses and $n=7$ including remainder 1 is stored in two remaining addresses. Thus, the control amount table is prepared so that the relationship of the movement pulse number $M=n_0+n_1+\cdots+n_7$ is established even though a remainder is produced in N division of the control pulse number M.

The following describes concretely the method for preparing the information table in accordance with the apparatus shown in FIG. 1.

The control amount table is fixedly stored in the memory of the digital valve control apparatus 10 since the number of pulses which given the maximum control amount of the pulse motor is determined.

Figure 4:
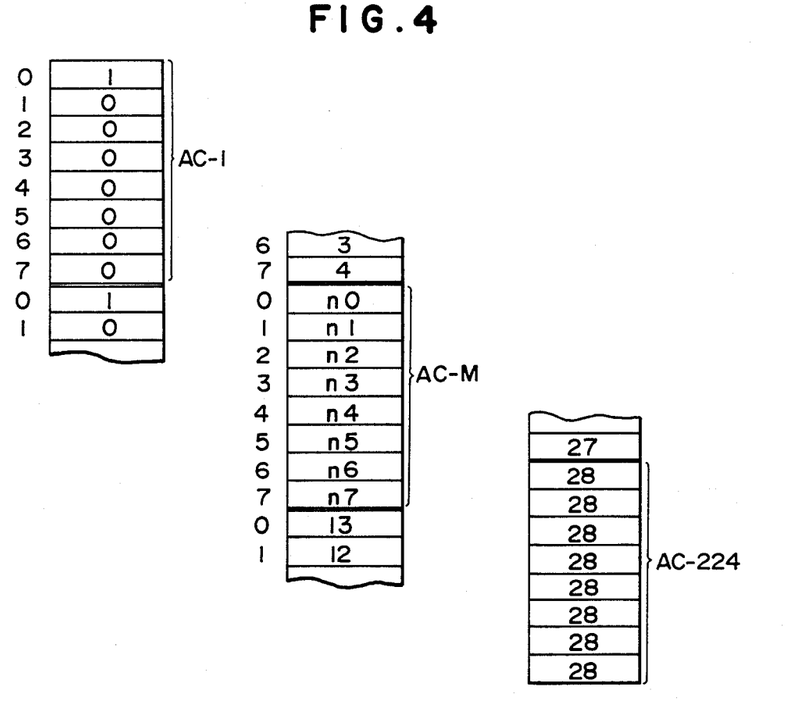
FIG. 4 is an illustration showing an example of the control amount information table prepared in accordance with the present invention.

FIG. 4 is an illustration showing the control amount information table which is fixedly stored in the memory 26 and this information table is referred to the example when the maximum control pulse number of the pulse motor 16 is determined to be 255 steps. The information table as much as for 255 blocks shown by the blocks with the set opening $M=1$ to $M=255$ corresponding to the number of steps is fixedly stored in the memory 26.

Figure 5:
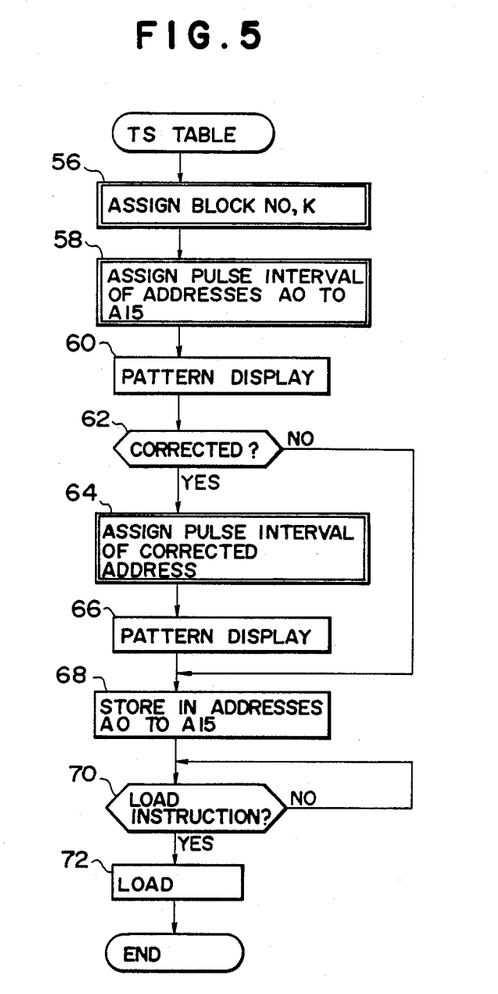
FIG. 5 is a flowchart showing a procedure for preparing the time information table in accordance with the present invention.

FIG. 5 is a flowchart showing the method for preparing the time table information in the system configuration shown in FIG. 1.

The block No. K of the time table to be prepared by the support apparatus 12 as shown in the block 56 is specified and the pulse interval $T_0 \sim T_7$ of address $A_0 \sim A_7$ of the table blocks which is divided into eight blocks as shown in the block 58 is specified by operation of the keyboard 48. If this pulse interval $T_0 \sim T_7$ is specified, the set opening, that is, the movement pattern given by assignment of pulse interval $T_0 \sim T_7$ for each divided pulse number of the control pulse number is displayed on the CRT display 50 of the support apparatus 12 as shown, for example, in FIG. 3. Accordingly, the time table is prepared so that the movement pattern can be displayed on the CRT display 50 by specifying the block No. M corresponding to an appropriate set opening from the control amount information table of the memory 26.

Subsequently, the correction is commanded while observing the movement pattern displayed on the CRT disply 50 as shown in the judging block 62, the pulse interval of the correction address is commanded again by blocks 64 and 66 based on the correction command and the displayed, pattern is changed to have the control characteristic based on the corrected pulse interval through this correction. If no correction is required, blocks 62 and 64 are not executed.

When the preparation of the time table is thus finished, the pulse interval $T_0 \sim T_7$ set in address $A_0 \sim A_7$ of the memory built in the information table preparing device 46 is written by the command from the keyboard 48 as shown in the block 68 and the judging block 70 is made to wait for the load instruction to the digital valve control apparatus 10.

When a plurality of types of movement patterns are prepared by repeating the processing shown in blocks 56~70 and the load instruction for the digital valve control apparatus 10 is given finally by operation of the keyboard 48, the time information table prepared is serially transferred from the information table preparing device 46 of the support apparatus 12 to the loader 44 of the digital valve control apparatus 10 and written in the memory 30.

Figure 6:
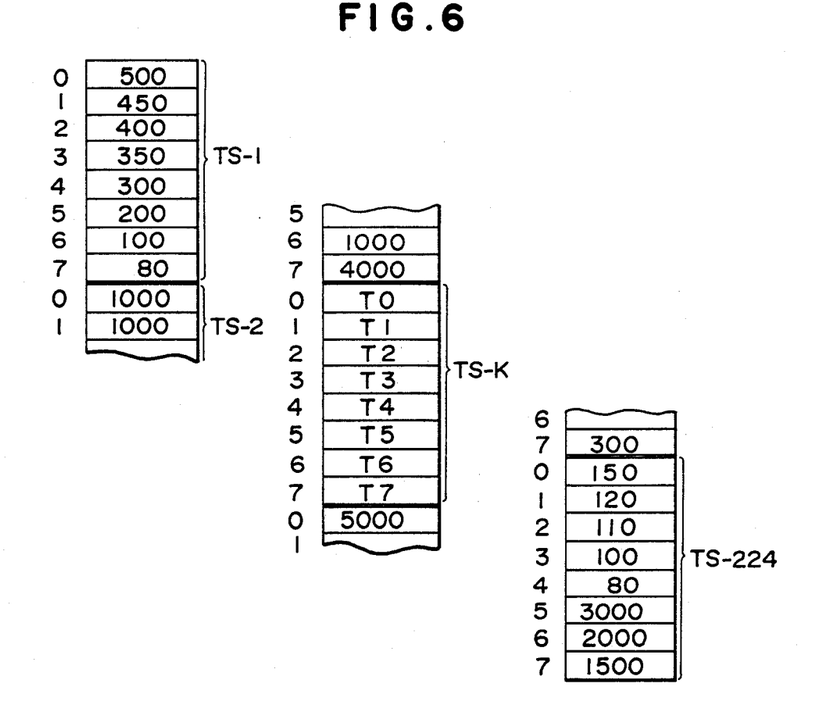
FIG. 6 is an illustration showing the time table prepared in accordance with the present invention.

FIG. 6 is an illustration showing an example of the time information table prepared according to the flowchart in FIG. 5 and the time information table including 31 types which are TS 1~31. Each block is divided into 8 addresses $A_0 \sim A_7$ and the time for giving the pulse interval with $10\mu$ sec as the unit is written in each address.

On the other hand, the setting of the movement pattern of the digital valve is limited to the preparation of the basic movement pattern in accordance with the control load of the digital valve since the optimum control characteristic cannot be obtained when the digital valve control apparatus is manufactured.

The time information table which is finally used in the digital valve control apparatus 10 is prepared in such manner that the support apparatus 12 is connected by the connector 42 to the digital valve control apparatus 10 which is incorporated as the control apparatus for an actual machine, for example, a plastic injection molding machine at the user's side, as shown in FIG. 1, the digital valve 14 is controlled according to the time information table prepared to the flowchart shown in FIG. 5, the result of this control is monitored by the monitoring device 54 such as an oscilloscope or a visiscope and, if the result of control is unsatisfactory, the time information table is corrected or changed again in the support apparatus 12 by writing the information into the memory 30 of the digital valve control apparatus 10 through the loader 44 and the result of control is confirmed by conducting again the test. Thus, the table information which provides the control characteristic of an optimum digital valve is prepared by repeating the above procedure.

If an optimum result of control is obtained based on the time information of the memory 30, the support apparatus 12 connected by the connector 42 is disconnected from the apparatus 10 and, if it is necessary to change the control pattern, the information table is newly prepared or similarly corrected and changed by reconnecting the connector 42.

Figure 7:
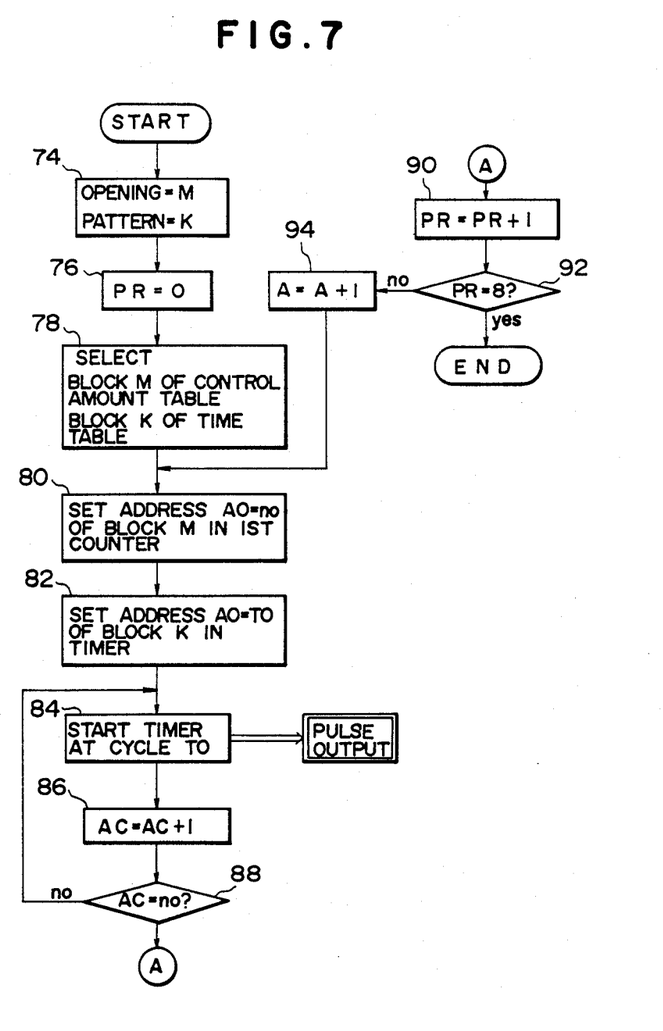
FIG. 7 is a flowchart, showing the operation of the digital valve control apparatus based on the information table.

Referring to FIG. 7 Program Flowchart, the operation of the digital valve control apparatus 10 shown in FIG. 1 is described.

The operator sets the opening M (the block No. of the control amount table) by the opening setter 20 and selects a desired control pattern K (the block No. of the time table) from the table in the memory 30 by the pattern setter 22 and sets it. If the opening M and the control pattern K are specified, the opening M and the pattern K are read in the block 74, the first counter 34 is preset to PR=0 in the block 76, and the block M of the control amount table stored in the memory 26 and the block K of the time table stored in the memory 30 are selected in block 78. Subsequently, the pulse number $n_0$ stored in the first address $A_0$ of block M in the control amount table is set in the first counter 32 in block 80 and the pulse interval $T_0$ stored in the first address $A_0$ of block K selected as to the time table is set in the timer 36 in block 82. The timer 36 in which the pulse interval $T_0$ is thus set generates a pulse of specified pulse width which has the pulse interval $T_0$, and this pulse from the timer 36 is supplied to the driver 40 through the multiplexer 38 and drives the pulse motor 16 of the digital valve 14 to rotate one step in the preset direction of rotation. At the same time, the output pulse of the timer 36 is supplied to the first counter 32, which is incremented as shown in block 86. Subsequently the judging block 88 judges whether or not the counted value of the first counter 32 coincides with the pulse number $n_0$ set in block 80 and, if it does not coincide, the operation is returned to block 84 and the next pulse is outputted at the pulse interval $T_0$. Accordingly, in blocks 84, 86 and 88, the pulse output by the timer 36 is repeated until the pulses in a number equal to the pulse number $n_0$ set in the first counter 32 in block 80 is outputted.

On the other hand, if the judging block 88 judges that the counted value of the first counter 32 coincides with the set pulse number $n_0$, the first counter 32 produces the counting output and the second counter 34 is incremented as shown in block 90. Subsequently the judging block 92 judges whether or not the counted value of the second counter 34 coincides with the dividing number N=8. When the counted value of the second counter 34 is less than 8, the operation advances to block 94 to increment address $A_0$ since the control is still continued and returns to block 80 to perform setting of the pulse number $n_1$ of address $A_1$ of block M for the first counter 32 and setting of the pulse interval $T_1$ of address $A_1$ of block K for the timer 36. Similarly, $n_1$ pulses with pulse interval $T_1$ are generated in blocks 84, 86 and 88.

Subsequently, the pulse is outputted from the timer 36 on the basis of address $A_2 \sim A_7$ in table blocks M and K and, when the pulse output by address $A_{15}$ is completed and reaches the judging block 92, the counted value of the second counter 34 is 8 and accordingly the control according to the specified control amount table and time tables is finished.

The above embodiment of the present invention refers to an example in which the dividing number is N=8. A desired integer can be determined as the value of dividing number N as desired and actually N=16 provides the best mode. The digital valve for controlling a flow rate by varying the throttle opening is adapted as an example of the digital valve. However, the present invention can be directly applied to a digital valve for controlling the pressure which is adapted to vary the load on a set spring load of a relief valve the use of a pulse motor.

What is claimed is:

1. A method for preparing information tables for a digital valve control apparatus which include: a first memory means for storing a first information table including a plurality of different pulse number data blocks corresponding in number to a number of control pulses required for a maximum controlled variable of a digital valve, each of said pulse number data blocks consisting of pulse number data obtained by dividing a given number of control pulses for a pulse motor for driving said digital valve by a number N, said pulse number data being stored in N divisions such that a sum of pulse numbers stored in the respective divisions is equal to said given number of control pulses; a second memory means for storing a second information table including control pattern data consisting of a plurality of different pulse period data block, each of said pulse period data blocks consisting of pulse period data stored in N pulse period divisions corresponding to said N divisions; a pulse generating means for generating pulse signals to drive said pulse motor in accordance with said first and second information tables corresponding to a specified number of control pulses and control pattern; and external apparatus comprising an information table preparing means, a keyboard and a display provided as an external system for said digital valve control apparatus, and a write/read memory comprising said second memory means;

the method comprising the steps of:
(a) preparing said second information table with said external apparatus;
(b) storing said second information table prepared in said first step in said write/read memory provided as said second memory means through a data transfer from said external apparatus; and
(c) controlling said digital valve by said digital valve control apparatus with a test operation command after storing said second information table in said write/read memory through said data transfer, and disconnecting said external apparatus from said digital valve control apparatus when a desired control characteristic is obtained, and correcting said second information table by means of said external apparatus and disconnecting said external apparatus from said digital valve control apparatus after a test operation when a desired control characteristic is not obtained.

2. A method for preparing information tables according to claim 1, wherein said first step also includes displaying a control characteristic based on said second information table set by said keyboard on said display as a graph with coordinate axes for denoting time and a controlled variable.

3. A method for preparing information tables according to claim 1, wherein said test operation in said third step is effected by specifying a block number of said second information table prepared in said first step and a desired block number of said first information table.

4. A method for preparing information tables according to claim 1, wherein whether or not a desired control characteristic is obtained is determined by measuring a condition of a load driven by controlling said digital valve.

* * * * *